United States Patent [19]

Boyd

[11] 4,373,645

[45] Feb. 15, 1983

[54] RESILIENT LINER FOR PARTICULATE BULK CARGO RECEPTACLES

[75] Inventor: Hugh Boyd, Tallmadge, Ohio

[73] Assignee: Goodyear Aerospace Corporation, Akron, Ohio

[21] Appl. No.: 248,765

[22] Filed: Mar. 30, 1981

[51] Int. Cl.³ .............................................. B65G 69/08
[52] U.S. Cl. .................................... 222/203; 222/460
[58] Field of Search ...................... 222/196, 386.5, 203, 222/195, 198, 406, 206, 214, 94, 95, 199, 460, 462

[56] References Cited

U.S. PATENT DOCUMENTS 2,646,905  7/1953  Vincent .......................... 222/203 X
3,502,240  3/1970  Paton ........................... 222/386.5 X Primary Examiner—Stanley H. Tollberg Attorney, Agent, or Firm—P. E. Milliken; L. A. Germain

[57] ABSTRACT

A resilient liner for mounting within a hopper type receptacle which receives and discharges flowable bulk particulate material. The liner is comprised of one or more resilient panels each having a fluid tight envelope with a top and bottom sheet held in substantially spaced parallel relationship by a series of internal transverse seams or walls or by a layer of open celled foam when the internal pressure of the envelope is at least slightly higher than the ambient pressure outside the envelope. The panels are sufficiently resilient, that particles or chunks of material passing through the hopper striking the top of the envelope cause undulation of the top of the envelope which aids in maintaining the constant flow of particulate material through the receptacle. The panels may be protected by a wear resistant cover loosely covering the panels or integral with the panels.

9 Claims, 5 Drawing Figures

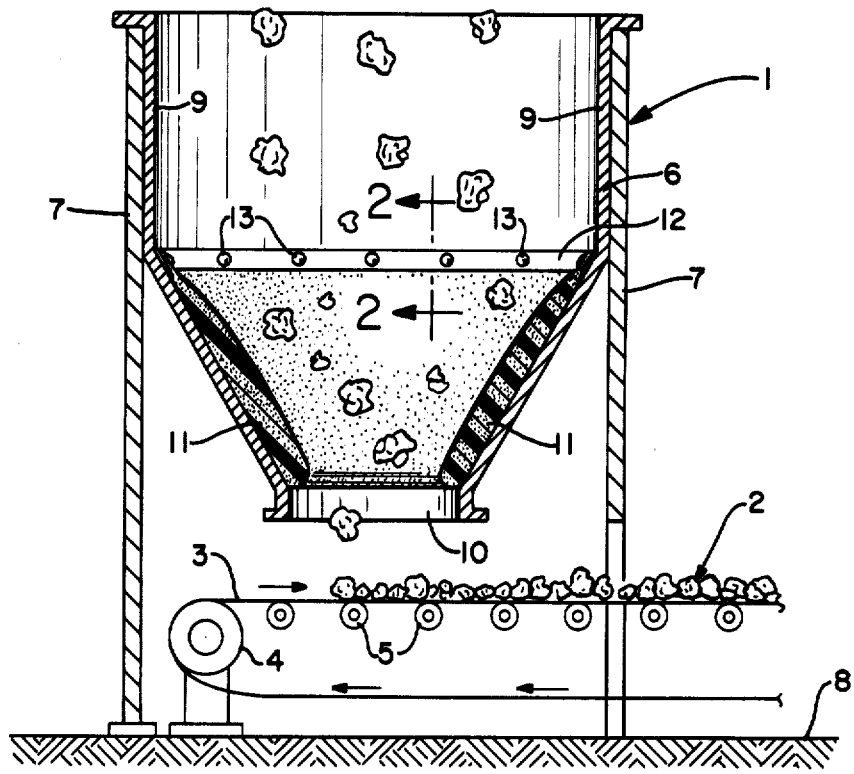
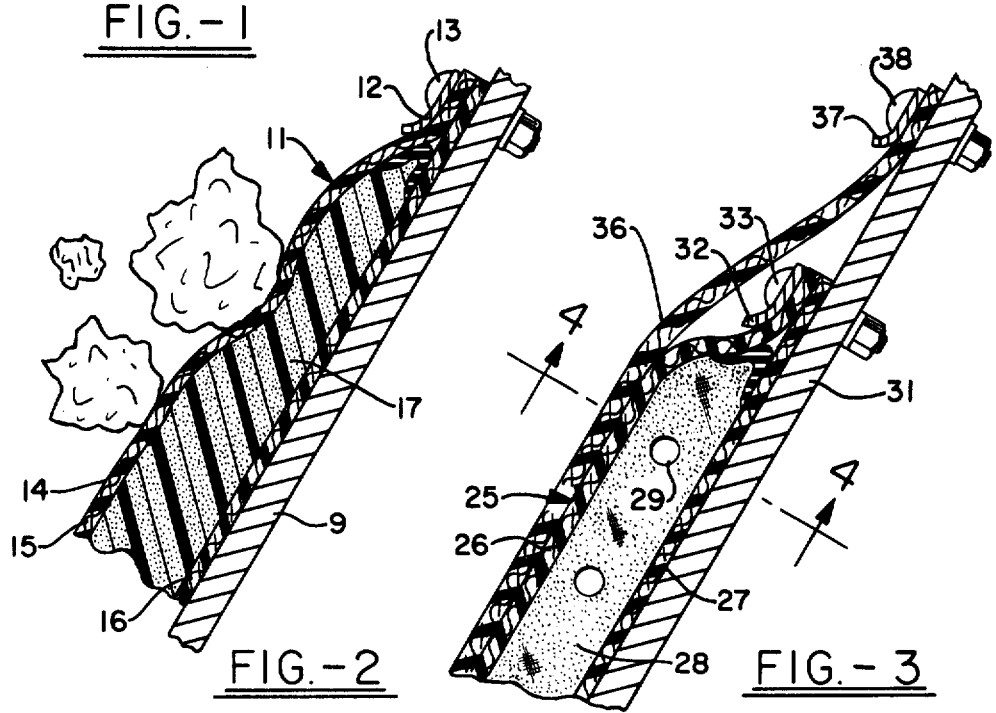
FIG.-1
FIG.-2
FIG.-3

RESILIENT LINER FOR PARTICULATE BULK CARGO RECEPTACLES

This invention relates to a resilient liner for mounting within a hopper type receptacle which receives and discharges flowable bulk particulate material.

BACKGROUND OF THE INVENTION

In the past many devices have been used within hopper type containers to maintain a continuous flow of particulates through the container. Such devices are often needed when materials such as coal, ore, sand and other particulate materials tend to rathole or become impacted within the container particularly when they are of certain external shapes or surfaces or are mixed with water or a bonding agent or exposed to freezing temperatures.

Some of the hoppers have been equipped with vibrators for shaking the container or its walls to dislodge the particulate matter and induce a flow through the container. In some instances jets of high pressure air have been introduced into the material to start and maintain its continuous flow through the receptacle.

In addition to these techniques various types of inflatable bags have been placed on the inner walls of the containers and alternately inflated and deflated to create a varying pressure against the particulate matter and break such jams or icing of the material. A typical example of such device is shown in U.S. Pat. No. 2,646,905 issued to W. R. Vincent. Such device operates somewhat on the principle of the inflatable deicers used on aircraft wings, such as that on U.S. Pat. No. 2,536,739 issued to H. E. Greene. The above mentioned Vincent patent appears to be one of the closest prior art patents known to the inventor of the invention described in this specification.

SUMMARY OF THE INVENTION

The present invention is designed to simplify the procedure of maintaining the flow of particulate material through a container by eliminating the need for alternately inflating and deflating various individual chambers and compartments. According to this invention there is provided a resilient liner for mounting within a hopper type receptacle which receives and discharges flowable bulk particulate material. The receptacle has conical or sloping walls in at least the bottom portion and the liner comprises one or more panels with each adjacent panel comprising a fluid filled envelope or mattress having a top and bottom portion, a valve located in the envelope in communication with the inside and outside of the envelope through which fluid may pass in or out of the envelope when the valve is open and a spacer member within the envelope to retain the exterior surfaces of the top and bottom portion in substantially spaced parallel relationship to each other, when the inside of the envelope is at a static pressure at least slightly higher than the ambient exterior pressure. The envelope and spacer member cooperatively interact with each other in such manner that when the panel is attached to the inside of one of the walls of a receptacle and pieces of particulate material passing through the receptacle strike the top portion of the envelope, the top portion is deflected inwardly in the areas struck, thereby creating an undulating motion on the top portion of the panel which aids in maintaining a constant flow of particulate material through the receptacle, and a means is provided for attaching each panel to the inside of the receptacle walls.

BRIEF DESCRIPTION OF THE DRAWINGS

FIG. 1 is a front elevational view of the overall apparatus of the invention with portions broken away to show the interior of the hopper type receptacle;

FIG. 2 is an enlarged fragmentary cross-sectional view taken on line 2—2 of FIG. 1;

FIG. 3 is an enlarged fragmentary cross-sectional view at a location similar to FIG. 2 but showing another embodiment of the invention;

DESCRIPTION OF THE PREFERRED EMBODIMENT

Figure 4:
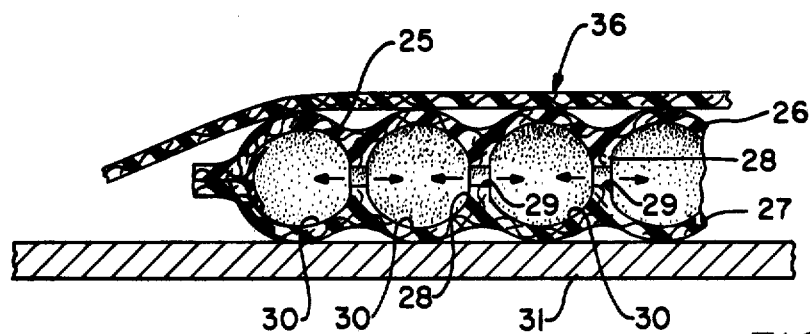
FIG. 4 is an enlarged fragmentary cross-sectional view taken on line 4—4 of FIG. 3.

Referring now to FIG. 1 the numeral 1 indicates a hopper assembly such as the type used for receiving and dispensing coal or other particulate matter. The numeral 2 indicates a conveyor belt assembly having a conveyor belt 3 traveling in the direction of the arrows adjacent the belt to move the coal dropping through the hopper to a desired location remote from the hopper. The belt is mounted on a number of rollers such as the drive roller 4 and a plurality of idler rollers 5 mounted on a conventional structure, not shown, for the purpose of simplicity. The hopper assembly has a hopper receptacle 6 which is supported above the conveyor system 2 by suitable support members 7 which are attached to a base or floor indicated by the numeral 8. The receptacle 6 as shown in FIG. 1, is of rectangular shape when viewed in plan view (not shown), however, it could also be of conical shape. The receptacle 6 has side walls 9 which are vertical in the upper portion and are tapered inwardly in the lower portion of the receptacle terminating in an outlet 10 at the lower end of the receptacle through which the coal or other material may drop onto the moving belt 3.

Referring now to both FIGS. in 1 and 2, a plurality of resilient panels 11 are attached at their upper marginal edges to the wall 9 by a clamping bar 12 which is held in position against the upper marginal edge of the panel 11 by a plurality of bolts 13 which pass through the bar 12 the marginal edge of the panel 11 and through the wall 9, thereby clamping the marginal edge of the panel 11 between the bar 12 and the wall 9. To provide a smooth outer surface, the bolts 13 should be flat, round or countersunk into the clamping bar 12.

Referring now in particular to FIG. 2, it may be seen that the panel 11 is comprised of a fabric reinforced envelope 14 coated preferably with an elastomeric material. The envelope has a top sheet 15 and a bottom sheet 16 which are adhered together around their entire peripheral edge by a suitable adhesive and the two sheets may be vulcanized together to form the envelope 14 into an air tight chamber. The interior of the envelope is filled with a resilient core 17 made of an open celled resilient foam such as polyurethane or other suitable material which is adhered to the top and bottom sheets.

Figure 5:
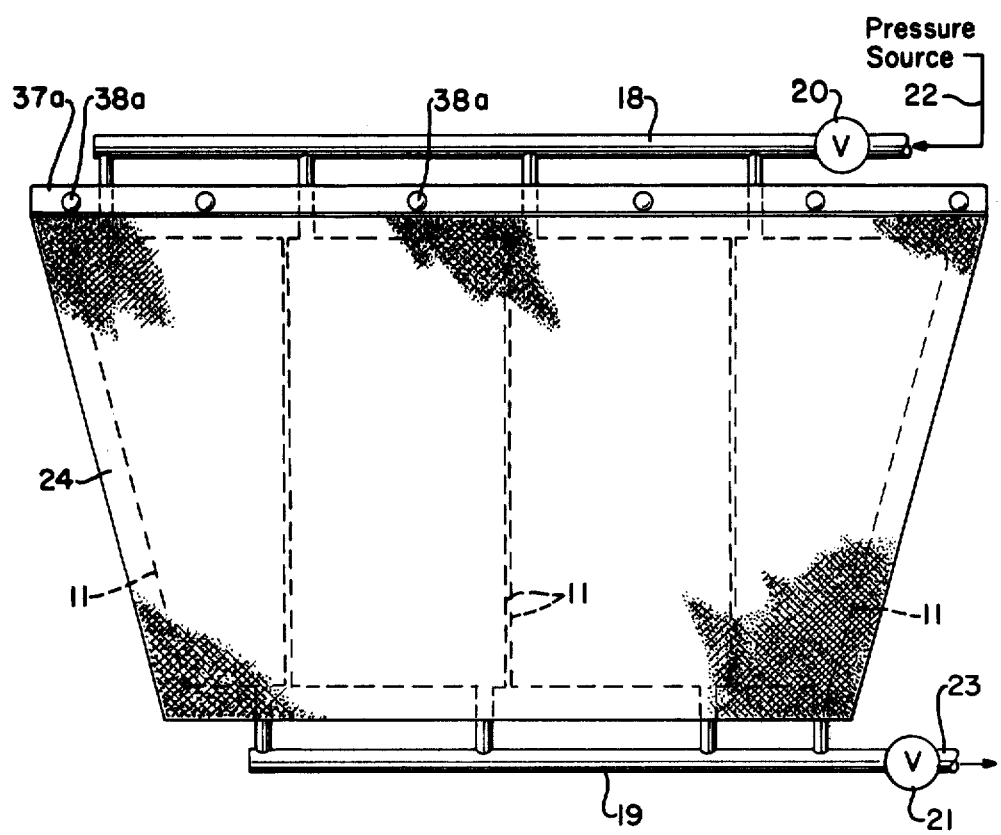
FIG. 5 is a diagramatic view showing an assembly of panels similar to those in FIGS. 1 and 2 with a manifold system incorporated therewith.

Referring now to FIG. 5, a series of the panels 11 clamped in position as they would be located on the wall 9 with a suitable inlet manifold 18 and an outlet manifold 19 connected respectively through valves 20 and 21. The inlet valve 20 is connected to a pressure supply line 22 which in turn is connected to a source of fluid pressure such as air pressure or the like. The valve 21 connects to an exhaust line 23 for relieving the internal pressure from within the panels 11, when the valve 20 is closed and the valve 21 is opened. The manifold 19 also serves as a drain to remove any undesirable moisture or condensation from the panels 11. To pressurize the panels 11 valve 21 is closed and valve 20 is opened.

As a variation of the invention a wear resistant cover sheet 24 may be suspended loosely on top of all of the panels 11 by means of a clamping bar 37a which is similar to the bar 37 shown in FIG. 3 held in place by bolts 38a through the receptacle wall similar to bolts 38 in FIG. 3. The method of attaching this cover sheet will be described in greater detail when describing the embodiment shown in FIG. 3.

In the operation of the embodiment shown in FIGS. 1 and 2 and also illustrated generally in FIG. 5, the valve 21 is closed and the valve 20 is opened to admit pressure into the opened celled foam core 17 of the panels 11. When the desired static pressure is reached, the valve 20 is closed thereby holding the interior of the panels at a static internal pressure which is at least slightly higher than the external pressure outside the panels. The amount of pressure used may be varied depending upon the degree of resiliency desired for the panels 11. For most effective operation, some materials passing through the hopper may operate best at higher pressures and some materials may operate best at lower pressures. As may be seen in FIGS. 1 and 2 when chunks of coal pass through the hopper and momentarily strike the panel 11 the struck portions of the panel are indented, thereby causing the top surface of the panel to undulate and thereby setting up a continuous random wave motion in the panel so long as chunks of coal are striking the panel. This in effect causes the coal adjacent to the surface of the panel to be unstable and thus to flow freely down the side of the receptacle 6 and toward the outlet 10. It has been found that this continuous flow of coal or other particulate can be accomplished by setting the panels at a static pressure and that cyclic inflation and deflation of the panel is not needed.

FIGS. 3 and 4 show another embodiment of the invention, which is quite similar to that of FIGS. 1 and 2 in principle, except the structure of the panel 25 is somewhat different from the panel 11. The panel 25 is constructed somewhat like a tubular multichamber cushion having a top sheet 26 a bottom sheet 27 which are sealed together around their outer peripheral edge to form an air-tight envelope with the top and bottom sheets being joined together by a series of transverse perforate walls 28 having air passages 29 therethrough allowing communication between all of the chambers 30 formed between the walls 28. An alternative cushion could be used in which the transverse walls terminate short of the ends of the cushion thereby eliminating the need for air holes in the transverse walls. The panel 25 is clamped to the receptacle wall 31 in a manner similar to that shown in the embodiment shown in FIGS. 1 and 2. The upper peripheral edge of the panel is clamped against the wall 31 by a clamping bar 32 held in place by plurality of bolts 33 passing through the wall 31. In the embodiments shown in FIGS. 3 and 4 the chambers 30 of the panels 25 are pressurized through a manifold system similar to that shown in FIG. 5 in the same manner as were the panels 11 previously described. The only basic difference is that in the embodiments in FIGS. 3 and 4 the top wall 26 and bottom wall 27 are held in fixed spaced relationship to each other by the transverse walls 28 rather than the foam core 17 which is present in the panels 11. The basic function of both the panels 11 and 25 are quite similar since they both involve the resiliency of the panel which permits undulation of the top of the panel when struck by the coal, thereby maintaining the continuous flow of the coal through the receptacle 6.

Since the cover sheet 36 is only attached along its top marginal edge, it does not interfere with the inflation and movement of the panel beneath the cover sheet 36 but merely serves as a means of protecting the panel from excessive wear of its outer envelope.

While for the purpose of illustrating the invention, these two embodiments of resilient panels have been shown and these particular means for connecting the panels and the cover sheet to the wall of the receptacle have been given as examples, it may be understood that there are other various means of constructing these resilient panels and attaching them to the receptacle. Instead of fastening the upper marginal edge of the panel 25 to the wall 31, it may be attached to the bottom side of the cover sheet 36 by suitable bolts passing through the cover sheet 36 and the edge of the panel 25. In another alternate panel construction the perforate walls 28 shown in FIGS. 3 and 4 may be replaced by a plurality of seams. The walls or seams may end before reaching the peripheral edge of the panel, thus developing interconnecting passages for the movement of the fluid between the chambers, thereby eliminating the need for the holes 29 through the walls 28. It should also be understood that panels having flexible walls such as the walls 28 or seams, as previously described, can also be filled with open celled foam of the type mentioned in the description of FIG. 2. These and various other modifications can be made herein without departing from the scope of the invention.

I claim:

1. A resilient liner for mounting within a hopper type receptacle which receives and discharges flowable bulk particulate material, said receptacle having conical or sloping walls in at least the bottom portion thereof, said liner comprising at least one panel, each panel comprising:

A. a fluid tight envelope having a top and bottom portion;
   B. a valve located in the envelope in communication with the inside and outside of the envelope, through which fluid may pass in or out of the envelope when the valve is open; and
   C. connecting means joined to the top and bottom portions of the envelope and extending therebetween within said envelope to retain said top and bottom portion in fixed spaced relationship to each other at various locations on both the top and bottom portion, said locations on one portion lying in a first plane and said locations on the other portion lying in a second plane substantially parallel to the first plane, said connecting means forming multiple chambers within the envelope when the inside of the envelope is at a static pressure at least slightly higher than the ambient exterior pressure;
   D. said envelope and connecting means cooperatively interacting with each other in such manner that when the panel is attached to the inside of one of the walls of a receptacle and pieces of particulate material passing through the receptacle strike the top portion of the envelope, the top portion is deflected inwardly in the areas struck, thereby creating an undulating random wave motion on the top portion which aids in maintaining a constant flow of particulate material through the receptacle; and E. means attaching each panel to the inside of receptacle walls.

2. The liner of claim 1 wherein the envelope is made from elastomer coated fabric material.

3. The liner of claim 1 wherein the connecting means is a plurality of flexible members connected between the top and bottom portion of the envelope.

4. The liner of claim 3 wherein the flexible members are perforate walls dividing the interior of the envelope into a plurality of interconnected chambers.

5. The liner of claim 3 wherein the flexible members are walls dividing the interior of the envelope into a plurality of chambers said walls terminating short of the peripheral edge of the envelope to provide interconnecting passages between said chambers.

6. The liner of claim 1 wherein the connecting means is a plurality of spaced substantially parallel seams forming said multiple chambers within the envelope, said seams terminating short of the peripheral edge of the envelope to provide interconnecting passages between said chambers.

7. The liner of claim 1 wherein the spacer means is a layer of open celled resilient foam material.

8. The liner of claim 1 wherein a wear resistant semi-flexible cover sheet extends across the top portions of all panels attached to the walls of the receptacle to prevent wearing of the top portion of the envelope by particulate material passing through the receptacle.

9. The liner of claim 8 wherein the cover sheet is made of an elastomer coated fabric material.

* * * * *